United States Patent [19]
Parker et al.

[11] Patent Number: 5,263,997
[45] Date of Patent: Nov. 23, 1993

[54] FLANGE BOLT LOAD SPREADING PLATE

[75] Inventors: David M. Parker, Oviedo; John A. Moreci, Lake Mary, both of Fla.

[73] Assignee: Westinghouse Electric Corp., Pittsburgh, Pa.

[21] Appl. No.: 858,461

[22] Filed: Mar. 27, 1992

[51] Int. Cl.$^5$ .............................................. F01D 25/24
[52] U.S. Cl. ................... 415/214.1; 403/30; 403/336; 403/337; 403/408.1; 411/380; 411/537
[58] Field of Search ........... 415/108, 134, 214.1, 415/182.1; 403/28-30, 335, 336, 337, 408.1; 411/537, 379, 380, 381, 382

[56] References Cited

U.S. PATENT DOCUMENTS

| | | | |
|---|---|---|---|
| 1,058,936 | 4/1913 | Bancel | 415/214.1 |
| 1,156,493 | 10/1915 | Rice | 403/337 |
| 2,211,874 | 8/1940 | Wilson | 415/202 |
| 2,467,818 | 4/1949 | Elston | 415/108 |
| 2,879,092 | 3/1959 | Hargrove et al. | 403/337 |
| 3,386,771 | 6/1968 | Verdier et al. | 411/537 |
| 4,063,831 | 12/1977 | Meuret | 403/28 |
| 4,755,092 | 7/1988 | Yaniv | 403/408.1 |

FOREIGN PATENT DOCUMENTS

| | | | |
|---|---|---|---|
| 0426489 | 3/1926 | Fed. Rep. of Germany | 411/379 |
| 2704492 | 8/1978 | Fed. Rep. of Germany | 403/408.1 |
| 1479733 | 5/1989 | U.S.S.R. | 403/408.1 |
| 1479734 | 5/1989 | U.S.S.R. | 403/408.1 |
| 0996382 | 6/1965 | United Kingdom | 403/337 |

*Primary Examiner*—Edward K. Look
*Assistant Examiner*—Christopher M. Verdier
*Attorney, Agent, or Firm*—M. G. Panian

[57] ABSTRACT

A plate for spreading bolt loading around the horizontal joint flanges of a turbomachine, such as a steam turbine, is provided. The plate is contoured so that its surface area substantially matches that of the surface of the steam turbine flange against which the compressive load associated with the joint bolt preloading is applied. The plate is disposed between the flange and the nuts on the joint bolts and is made from a high yield strength material so that the locally high stresses under the nuts do not cause creeping or yielding of the plate. The plate serves to distribute the compressive joint loading around the entire surface of the flange, thereby eliminating the locally high compressive stresses that can cause creep and yielding in the flange. Spherical counter bores are machined in the plate bolt holes and spherical washers are installed between the plate and the nuts so that misalignment of bolt holes does not cause the nuts to impose bending forces on the bolts.

6 Claims, 2 Drawing Sheets

FLANGE BOLT LOAD SPREADING PLATE

BACKGROUND OF THE INVENTION

The present invention relates to flanges for turbomachines, such as steam turbines and the like. More specifically, the present invention relates to a spreading plate that distributes the bolt loading over a steam turbine horizontal joint flange.

A turbomachine, such as a steam or gas turbine or the like, is comprised of a stationary cylinder that surrounds a centrally disposed rotor. Typically, the stationary cylinder is split horizontally into upper and lower halves to allow the rotor to be installed into the cylinder. The upper and lower halves are joined along mating horizontal flanges by bolts—as used herein the term "bolts" refers to any threaded fastener, including screws and studs. In one design, the bolts are threaded into tapped holes in the flanges in the lower cylinder half and nuts are threaded onto the free ends of the bolts that extend above the flanges in the upper cylinder half. To ensure that the pressurized working fluid—i.e., steam in the case of a steam turbine or gas and air in the case of a gas turbine—does not leak through the horizontal joints, a substantial preload is applied to the bolts.

As a result of the high bolt preload, the stresses in the bolt threads are very high. To ensure that the nut does not seat improperly, thereby imposing additional stress on the bolt due to the presence of a bending moment, in the past, a two piece washer was disposed between the nut and the flange. The upper washer piece had a convex spherical surface that mated with a concave spherical surface in the lower washer piece. The spherical surfaces allowed the upper washer piece to rotate under load so as to provide a surface for the nut to bear against that was perpendicular to the axis of the bolt.

In addition to the danger of excessive bolt stress, the high bolt preload can cause local creep in the portions of the flange under the nuts. This problem arises because the aforementioned washers distributed the bolt load over only a very small area of the flange surrounding each bolt hole. As a result, the localized contact stresses in the portions of the flange surface under the washer were very high. Consequently, after sufficient operating time at elevated temperature, local compressive creep occurred in the flange under the washers—referred to as creep indentation—that locally reduced the thickness of the flange causing a reduction in the bolt preload. This problem is exacerbated by thermal transients that cause differential thermal expansion between the bolts and the cylinder flange. Such differential thermal expansion can temporarily increase the bolt loading and, as a result, increase the local compressive stress in the portions of the flanges under the nuts beyond the yield point, leading to local crushing of the flange and further permanent loss of bolt preload. After sufficient operating time, the loss of bolt preload from these two mechanisms can result in leakage at the horizontal joints.

One approach considered in the past for solving this problem is to use a cylinder material that has very high yield strength and hardness. Unfortunately, although such high yield strength materials would make good flanges, they have insufficient ductility for use in the remainder of the cylinder, which is subjected to a variety of thermal and cyclic stresses.

Another approach considered in the past is to cool the flange area of the cylinder by directing a cooling fluid over the area. Such cooling serves both to reduce the temperature of the flange below that at which creep is likely to occur and to reduce the temperature difference between the bolts and the flange so that transient thermal differential expansion does not become great enough to result in yielding of the flange. Unfortunately, the use of a cooling fluid—such as low pressure steam in a steam turbine or compressor air in a gas turbine—degrades the thermodynamic performance of the turbomachine.

It is therefore desirable to provide an apparatus for preventing creep indentation and localized yielding of the horizontal joint flanges of a turbomachine in the portions of the flanges under the joint fasteners.

SUMMARY OF THE INVENTION

Accordingly, it is the general object of the current invention to provide an apparatus for preventing creep indentation and localized yielding of the horizontal joint flanges of a turbine in the portions of the flanges under the joint fasteners.

Briefly, this object, as well as other objects of the current invention, is accomplished in a turbomachine comprising (i) a centrally disposed rotor, (ii) a cylinder enclosing the rotor, the cylinder having first and second halves, the first cylinder half having first and second flanges along which the first cylinder half is joined to the second cylinder half, a plurality of first holes extending through the first and second flanges arranged in a pattern, (iii) a bolt for each of the first holes in the first and second flanges, each of the bolts having a fastener for applying a load to the flanges for joining the flanges to the second cylinder half, and (iv) a plate for each of the flanges for spreading the load from the bolts over the flanges, each of the plates having a plurality of first holes formed therein arranged is the pattern, whereby the plate first holes coincide with the first flange holes.

In one embodiment of the invention, a washer is provided for each of the fasteners disposed between its respective fastener and the plate, and each of the first plate holes has a counter bore adapted to receive the washer. Each of the counter bores and each of the washers have mating spherical load bearing surfaces.

DESCRIPTION OF THE PREFERRED EMBODIMENT

Figure 1:
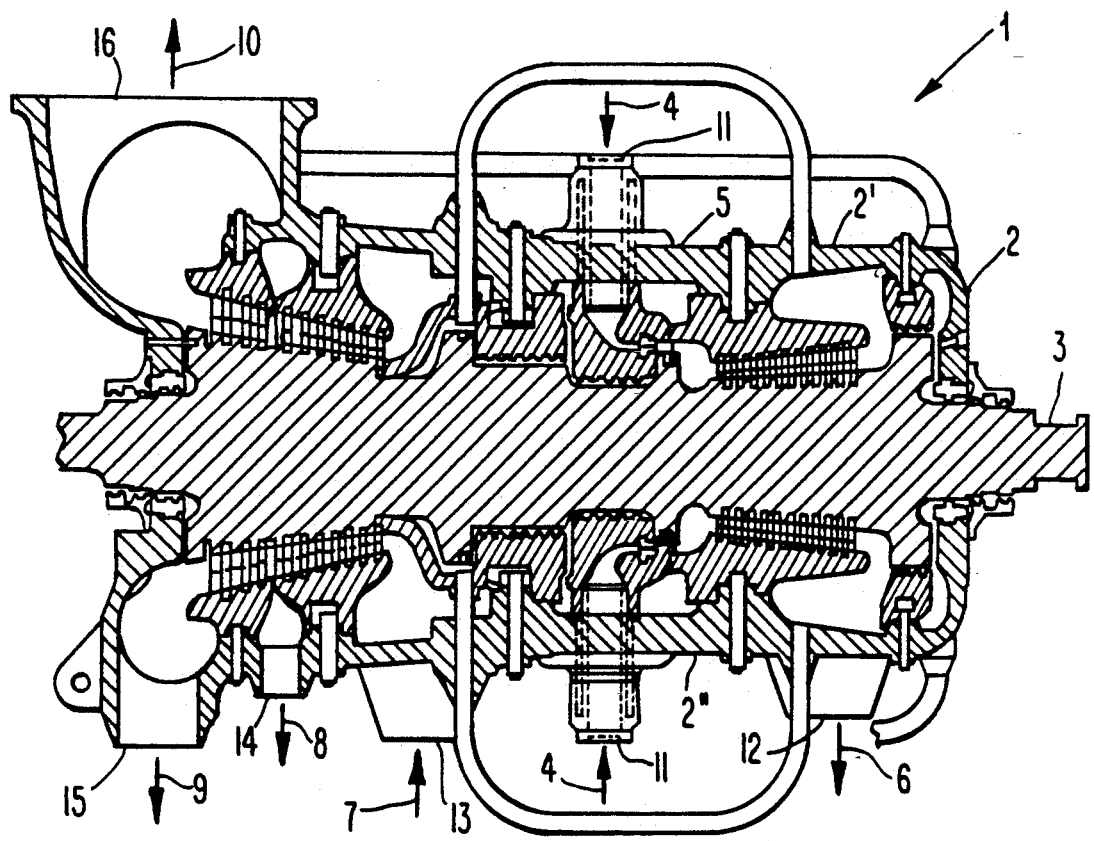
FIG. 1 is a longitudinal cross-section through a steam turbine.

Referring to the drawings, there is shown in FIG. 1 a longitudinal cross-section through a steam turbine 1. The turbine is comprised of a stationary cylinder 2 that encloses a centrally disposed rotor 3 and that directs the flow of steam into, out of, and through the turbine. Thus, high pressure steam 4 enters the turbine through steam inlet ports 11 formed in the inlet section 5 of the cylinder 2. High pressure steam 6 is exhausted from the cylinder through an exhaust port 12 and reenters the cylinder as intermediate pressure steam 7 through port 13. Intermediate pressure extraction steam 8 and 9 is drawn from the cylinder through ports 14 and 15, respectively, and the remainder of the intermediate pressure steam 10 exhausts through port 16.

Figure 2:
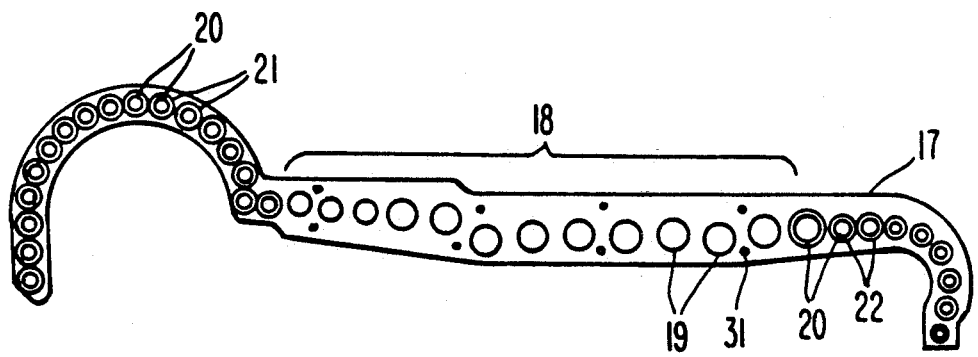
FIG. 2 is a plan view of one of the horizontal joint flanges of the steam turbine shown in FIG. 1 according to the current invention.

As previously discussed, the cylinder 2 is comprised of an upper half 2' and a lower half 2" to allow for installation of the rotor 3. The two cylinder halves are joined along right and left split lines typically referred to as the "horizontal joints." The horizontal joints are formed by joining together right and left longitudinally extending flanges formed at the longitudinal edges of each of the cylinder halves 2' and 2". The right flange 17 of the upper cylinder half 2' is shown in FIG. 2. The left flange is not shown but is essentially a mirror image of the right flange. Similar right and left flanges are formed on the lower cylinder half 2". As can be seen, a number of bolt holes 19 and 20 are arranged in a pattern around the flange 17.

Figure 5:
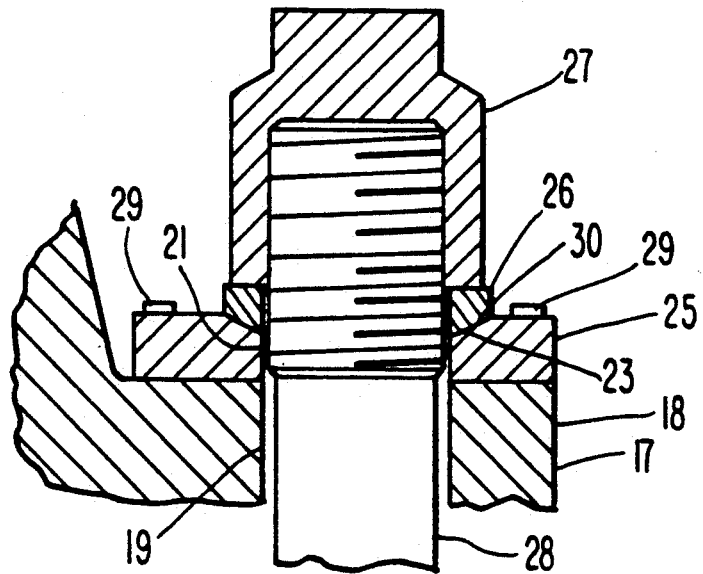
FIG. 5 is a cross-section through the horizontal joint flange shown in FIG. 2 as assembled.

As shown in FIG. 5, the flange 17 is joined to the corresponding flange (not shown) in the lower cylinder half by bolts 28 that extend through the holes 19 and 20 in the flange. The bolts 28 are threaded into tapped holes in the lower cylinder half flange. A fastener is provided on each bolt 28 to apply a preload to the bolt. In the preferred embodiment, the fasteners are nuts 27 threaded onto the portions of the bolts 28 that extend beyond the flange 17. However, the fasteners could also be heads formed integrally on each bolt so that nuts were not required. The reaction force from the bolt preload creates a compressive force that acts on the flange upper surface. As previously discussed, this compressive force can cause localized creep deformation and yielding in the portion of the flange under the nuts 27 that ultimately results in a loss of bolt 28 preload and leakage of steam through the horizontal joints.

As shown in FIG. 2, a portion 18 of the flange 17 is disposed in the inlet section 5 of the cylinder 2 and, accordingly, is exposed to the highest temperature steam. As a consequence, the temperature of the flange is hottest in portion 18 so that this portion is most likely to suffer from the aforementioned localized yielding and creep deformation. Consequently, in the preferred embodiment, a bolt load spreading plate 25, shown in FIG. 3, is utilized in portion 18 of the flange 17 to reduce the local stresses by distributing the compressive force around the flange upper surface.

Figure 3:
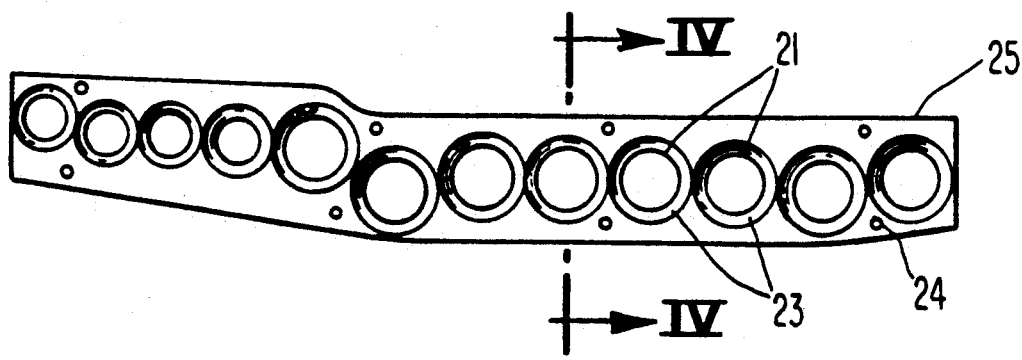
FIG. 3 is a plan view of the bolt load spreading plate according to the current invention.
Figure 4:
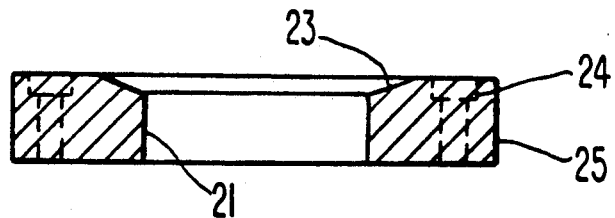
FIG. 4 is a cross-section through line IV—IV shown in FIG. 3.

As shown in FIGS. 3 and 4, in the preferred embodiment, the bolt load spreading plate 25 is contoured to match the upper surface of the portion 18 of the flange 17 to which the compressive load is applied and has a surface area approximately equal to that of the flange upper surface. As a result, the plate 25 encompasses both the areas of the flange portion 18 that are directly under the nuts 27 as well as the areas of the flange portion that are not under the nuts. In general, the planar expanse of the plate 25 must be sufficiently great to distribute the compressive load over a large enough area of the flange so that the contact stresses under the plate do not exceed the creep strength of the flange material during steady state operation nor exceed the yield strength during transients. Consequently, the specific size of the plate 25 will depend on the size of the flange. In one embodiment of the current invention, the load spreading plate is approximately 240 cm (94 inches) long by 30 cm (12 inches) wide by 5 cm (2 inches) thick.

Bolt holes 21 are drilled in the plate 25 in a pattern that matches that of the bolt holes 19 in the flange portion 18. In addition, holes 24 are formed in the plate 25 to allow screws 29, shown in FIG. 5, to be installed. The screws 29 are threaded into tapped holes 31 in the flange 17 so that the plate 25 remains secured to the flange when the nuts 27 are removed at disassembly. As shown in FIG. 4, a counter bore 23 is formed concentrically with each of the holes 21. The surface of the counter bore 23 is spherically concave.

As shown in FIG. 5, the horizontal joint is assembled by placing the load spreading plate 25 over the upper surface of the flange portion 18 so that the holes 21 in the plate are aligned with the holes 19 in the flange. Washers 26, having a spherical convex surface of the same shape as the surface of the counter bore 23, are installed into the counter bore between the plate 25 and the bearing surface of the nuts 27. As the nut 27 is tightened down, the spherical mating surfaces between the washer 26 and the counter bore 23 allow the washer to rotate as required so that the surface against which the nut bears is exactly perpendicular to the axis of the bolt 28, even if, due to machining errors, the bolt axis is not exactly perpendicular to the surface of the flange. Such rotation prevents the nut from imparting a bending load onto the bolt.

Since the plate 25 is not subjected to significant thermal stress the material form which it is formed need not have the ductility of the cylinder 2. Consequently, the plate 25 is preferably made from a very high yield strength, high creep strength, low ductility metal, such as alloy ASTM A 542, type A, having a yield strength of at least approximately 700N/mm$^2$ (100 KSI). Such metals are able to withstand the high local compressive stresses imposed on the portions of the plate 25 immediately under the nuts 27 without yielding or experiencing appreciable creep deformation. Moreover, the plate 25 and cylinder 2 materials are selected so that their thermal coefficients of expansion are similar—i.e., within 10% of each other in the preferred embodiment—thereby minimizing differential thermal expansion between the flange and plate. In addition, in the preferred embodiment, the washers 26 are also made from a high strength material.

The thickness of the plate 25—at least ~5 cm (2 inches) in the preferred embodiment—is such that the plate has sufficient stiffness to distributes the compressive force from the nuts over substantially the entire upper surface area of the flange portion 18—that is, to the areas that are not under the nuts 27 as well as to the areas that are under the nuts—so that locally high stresses are avoided in the flange.

As shown in FIG. 2, in the cooler portions of the flange not in the inlet section 18—and, therefore, not as subject to creeping or yielding—two piece spherical washers 22, rather than a load spreading plate, are utilized for each hole 20, as heretofore done.

The present invention may be embodied in other specific forms without departing from the spirit or essential attributes thereof. Thus, although the invention has been described by reference to the horizontal joint flanges in a steam turbine, the invention is also applicable to other flanges in a steam turbine, as well as flanges in other types of machines, such as gas turbines and the like. Moreover, although the spreading plate has been shown as being applied to only the portion of the flange in the inlet section of the steam turbine, it may also be applied to other portions of the flange or to the entire flange. Also, although the plate has been described by reference to spreading the loading applied by the nuts threaded onto the joint bolting, the invention could also be applied to distribute the locally high loading associated with seating plates used in conjunction with hydraulic bolt tensioners. Accordingly, reference should be made to the appended claims, rather than to the foregoing specification, as indicating the scope of the invention.

We claim:

1. A turbomachine comprising:
   a) a centrally disposed rotor;
   b) a high pressure cylinder enclosing said rotor, said cylinder having upper and lower halves, said upper and lower cylinder halves having upper and lower flanges respectively along which said upper cylinder half is joined to said lower cylinder half, a plurality of holes extending through said upper and lower flanges arranged in a pattern;
   c) a bolt for each of said holes in said upper and lower flanges, said bolts being threaded into the holes in said lower flanges and extending through the holes in said upper flanges with nuts threaded onto said bolts for applying a load to said flanges for joining said upper cylinder half to said lower cylinder half;
   d) a plate disposed on each of said upper flanges between said upper flanges and said nuts for spreading said load from said nuts over said flanges, each of said plates having a plurality of holes formed therein arranged in said pattern, such that said plate holes coincide with said upper flange holes, said plate consisting of a material having a yield strength of at least approximately 700N/mm² (100 KSI) and having a thickness of at least 5 cm (2 inches); and
   e) wherein said cylinder has an inlet section for introducing a high temperature, high pressure steam as working fluid into said turbomachine, a first portion of each of said flanges being disposed in said inlet section, said plate being disposed on said upper flanges only in said first portion of said flanges.

2. The turbomachine according to claim 1, further comprising a washer for each of said nuts disposed between its respective nut and said plate, each of said plate holes having a counter bore adapted to receive said washer and each of said counter bores and each of said washers having mating spherical load bearing surfaces.

3. The turbomachine according to claim 2, wherein said counter bore bearing surface is spherically concave and said washer bearing surface is spherically convex.

4. The turbomachine according to claim 1, wherein said plate is formed from a material having a first coefficient of thermal expansion and said cylinder is formed from a material having a second coefficient of thermal expansion, said first coefficient being within 10% of said second coefficient.

5. The turbomachine according to claim 1, further comprising means for securing each of said plates to its respective flange when said nuts are not installed.

6. The turbomachine according to claim 5, wherein said securing means are screws extending through said plate and being screwed into said upper flange.

* * * * *